United States Patent
Sato

(10) Patent No.: US 6,349,259 B1
(45) Date of Patent: Feb. 19, 2002

(54) NAVIGATION APPARATUS AND INFORMATION GENERATING APPARATUS

(75) Inventor: Hiroyuki Sato, Fujisawa (JP)

(73) Assignee: Xanavi Informatics Corporation, Zama (JP)

( * ) Notice: Subject to any disclaimer, the term of this patent is extended or adjusted under 35 U.S.C. 154(b) by 0 days.

(21) Appl. No.: 09/643,767

(22) Filed: Aug. 23, 2000

(30) Foreign Application Priority Data

Aug. 23, 1999 (JP) .......................................... 11-235467

(51) Int. Cl.$^7$ ............................................. G01C 21/00
(52) U.S. Cl. ...................... 701/207; 701/200; 701/213; 340/988
(58) Field of Search ................................ 701/200, 207, 701/208, 210, 213, 214; 340/988, 990, 995

(56) References Cited

U.S. PATENT DOCUMENTS 6,125,323 A * 9/2000 Nimura et al. .............. 701/207

* cited by examiner

Primary Examiner—Yonel Beaulieu
(74) Attorney, Agent, or Firm—Crowell & Moring LLP

(57) ABSTRACT

A navigation apparatus includes: a first position information generating device that generates first position information as current position information regarding the navigation apparatus based upon a signal received from outside; a second position information generating device that generates second position information as current position information based upon another signal received from outside; and a control device that implements control to provide route guidance based upon current position information and map information. And the control device uses the first position information as effective current position information if a position corresponding to the first position information generated by the first position information generating device is within an error range set for a position corresponding to the second position information generated by the second position information generating device.

12 Claims, 4 Drawing Sheets

NAVIGATION APPARATUS AND INFORMATION GENERATING APPARATUS

INCORPORATION BY REFERENCE

The disclosure of the following priority application is herein incorporated by reference:

Japanese Patent Application No. 11-235467, filed Aug. 23, 1999.

BACKGROUND OF THE INVENTION

1. Field of the Invention

The present invention relates to an information generating apparatus and a navigation apparatus, or more specifically, a car navigation apparatus that utilizes position information provided through beacons.

2. Description of the Related Art

There are car navigation apparatuses in the prior art with multiple functions such as a function of displaying a road map around the current vehicle position, a function of calculating a recommended route from the start point to the destination and a function of providing route guidance based upon the calculated recommended route. In such a car navigation apparatus, the current position of the vehicle must be detected. For this purpose, it is provided with a bearing sensor that detects the bearing along which the vehicle is advancing, a vehicle speed sensor that detects the vehicle speed and a GPS sensor that detects GPS signals transmitted from a GPS (Global Positioning System) satellite and the like.

In addition, the vehicle traffic information communication system (VICS, operated in Japan) provides road traffic information such as traffic jam information through FM multiplex broadcast, light beacons, radio wave beacons and the like. Information transmitted through light beacons and radio wave beacons includes position information indicating the position at which the beacon device is installed in addition to the VICS information. As a result, such beacon position information can also be utilized to detect the current position of the vehicle.

However, since erroneous position information is sometimes transmitted as the beacon position information, it is not used very often due to the lack of reliability. If the beacon position information can be utilized while assuring a high degree of reliability, it will be extremely useful for navigating a vehicle at a position where no map-matching achieved.

SUMMARY OF THE INVENTION

An object of the present invention is to provide an information generating apparatus that utilizes information with improved reliability achieved by improving the re liability of information having low reliability and, more specifically, to provide a navigation apparatus that utilizes position information with improved reliability by improving the reliability of information having low reliability. Another object of the present invention is to provide a car navigation apparatus capable of utilizing position information transmitted through light beacons or radio wave beacons in a highly reliable manner.

In order to attain the above object, a navigation apparatus according to the present invention comprises: a first position information generating device that generates first position information as current position information regarding the navigation apparatus based upon a signal received from outside; a second position information generating device that generates second position information as current position information based upon another signal received from outside; and a control device that implements control to provide route guidance based upon current position information and map information. And the control device uses the first position information as effective current position information if a position corresponding to the first position information generated by the first position information generating device is within an error range set for a position corresponding to the second position information generated by the second position information generating device.

In this navigation apparatus, it is preferred that the first position information has a higher degree of accuracy and a lower degree of reliability than the second position information;

Also, it is preferred that the navigation apparatus is a navigation apparatus installed in a vehicle; and the first position information generating device includes a beacon reception device that receives information transmitted by a beacon device installed at a road and generates the first position information by receiving position information indicating a position at which the beacon device is installed. In this case, it is preferred that the second position information generating device includes a satellite signal reception device that receives position signals from satellites and generates the second position information based upon the position signals which have been received.

Also, it is preferred that the second position information generating device includes a satellite signal reception device that receives position signals from satellites and generates the second position information based upon the position signals which have been received.

Also, it is preferred that a movement detection device that detects movement of the navigation apparatus is further provided, the movement detection device detects the movement of the navigation apparatus occurring over a period of time in elapsing between a time point at which the second position information generating device generates the second position information and a time point at which the first position information generating device generates the first position information, and the control device assumes a new position by incorporating the movement detected by the movement detection device into the position corresponding to the second position information and utilizes the first position information as effective current position information if the position corresponding to the first position information is within the error range relative to the new position.

Also, it is preferred that a movement detection device that detects movement of the navigation apparatus is further provided, the movement detection device detects the movement of the navigation apparatus occurring over a period of time in elapsing between a time point at which the second position information generating device generates the second position information and a time point at which the first position information generating device generates the first position information, and the control device expands the error range set for the position corresponding to the second position information by taking into consideration a traveled distance based upon the movement detected by the movement detection device.

Also, it is preferred that the control device expands the error range set for the position corresponding to the second position information by taking into consideration a length of time elapsing between a time point at which the second position information is generated by the second position information generating device and a time point at which the first position information is generated by the first position information generating device.

Also, it is preferred that the first position information generating device includes a position signal reception device that receives information transmitted by a position signal providing device and generates the first position information by receiving position information indicating a position at which the position signal providing device is installed.

An information generating apparatus according to the present invention, comprises: a first information generating device that generates first information as specific information; a second information generating device that generates second information as the specific information; a control device that uses the first information or the second information as the specific information under different circumstances. And the second information has a predetermined error range with respect to the specific information; the first information has a higher degree of accuracy and a lower degree of reliability than the second information; and the control device uses the first information as the specific information when the first information is within the error range of the second information.

A recording medium according to the present invention records a control program for a navigation apparatus. The control program comprises: a first instruction that generates first position information as current position information regarding the navigation apparatus based upon a signal received from outside; a second instruction that generates second position information as current position information based upon another signal received from outside; a third instruction that determines the first position information as effective current position information if a position corresponding to the first position information generated by the first position information generating device is within an error range set for a position corresponding to the second position information generated by the second position information generating device; and a fourth instruction that implements control to provide route guidance based upon the effective current position information and map information.

A data signal according to the present invention transmitted through a communication line comprises a control program for a navigation apparatus. The control program comprises: a first instruction that generates first position information as current position information regarding the navigation apparatus based upon a signal received from outside; a second instruction that generates second position information as current position information based upon another signal received from outside; a third instruction that determines the first position information as effective current position information if a position corresponding to the first position information generated by the first position information generating device is within an error range set for a position corresponding to the second position information generated by the second position information generating device; and a fourth instruction that implements control to provide route guidance based upon the effective current position information and map information.

DESCRIPTION OF THE PREFERRED EMBODIMENTS

Figure 1:
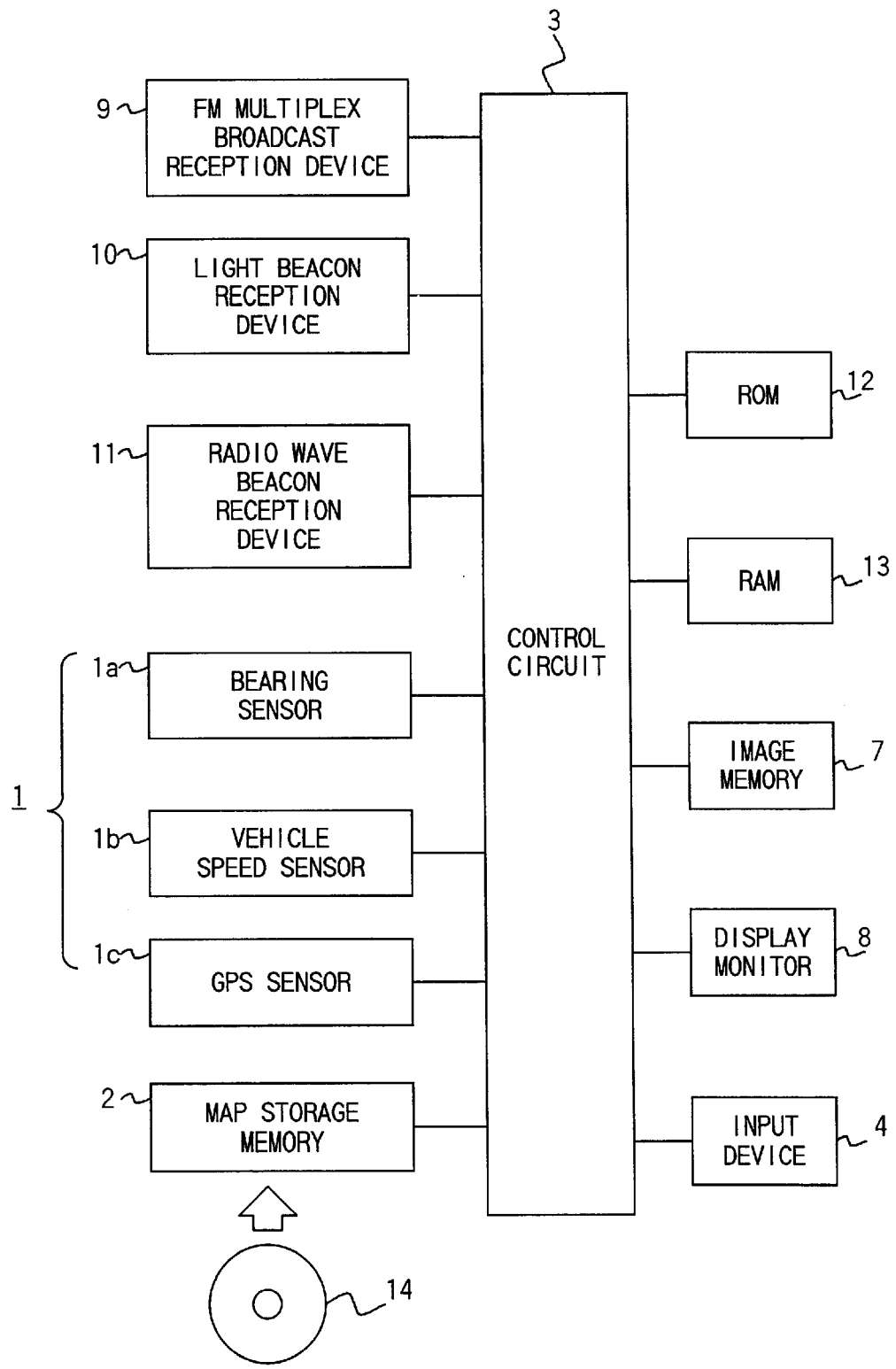
FIG. 1 shows a block diagram of the car navigation apparatus in an embodiment of the present invention.

FIG. 1 is a block diagram of a car navigation apparatus in an embodiment of the present invention. In FIG. 1, reference number 1 indicates a current position detection device that detects the current position (vehicle position) of the vehicle comprising, for instance, a bearing sensor 1a for detecting the bearing along which the vehicle is advancing, a vehicle speed sensor 1b for detecting the vehicle speed, a GPS sensor 1c for detecting GPS signals transmitted from GPS (Global Positioning System) satellites.

The bearing sensor 1a, which is constituted of a vibration gyro sensor or the like, detects the rotation angular velocity while the vehicle is turning and advancing and outputs a corresponding voltage signal. The vehicle speed sensor 1b, which may be mounted at, for instance, the transmission output shaft of the vehicle, outputs a pulse corresponding to the vehicle speed. Through the combination of the bearing sensor 1a and the vehicle speed sensor 1b, a two-dimensional movement of the vehicle can be detected. The GPS sensor 1c performs a specific arithmetic operation based upon GPS signals that it has received and ascertains the vehicle position. In this embodiment, an error represented by a circle with an approximately 100 m radius is allowed for the vehicle position ascertained by the GPS sensor 1c. It is to be noted that the vehicle position is indicated with a number of a mesh that is achieved by dividing the map in a mesh pattern and coordinate values in an X Y normalized coordinate system achieved by further dividing the map mesh.

Reference number 3 indicates a control circuit that controls the entire apparatus and is constituted of a microprocessor and its peripheral circuits. The control circuit 3 performs various types of control explained later by executing a control program stored in the ROM 12 using the RAM 13 as a working area. Reference number 4 is an input device having various switches through which the destination and the like for the vehicle is input. It includes a joystick used to move the cursor and scroll the screen. It is to be noted that the input device 4 may adopt a remote control system. In addition, touch panel switches may be provided on the screen.

Reference number 7 indicates an image memory that stores image data to be displayed at a display monitor 8, and the image data are prepared by using road map drawing data and various types of graphic data. The image data stored in the image memory 7 are read out as necessary and are displayed at the display monitor 8.

Reference number 9 indicates an FM multiplex broadcast reception device, reference number 10 indicates a light beacon reception device and reference number 11 indicates a radio wave beacon reception device, which respectively receive road traffic information (hereafter referred to as VICS information) transmitted by an FM broadcast station, a light beacon device and a radio wave beacon device. Light beacon devices are installed above a road and transmit information by using infrared rays. Radio wave beacon devices are installed above or by a road and transmit information by using radio wave. Light beacon devices and radio wave beacon devices are known in Japan as devices that transmit VICS information. The VICS is the vehicle traffic information communication system that is operated in Japan and provides road traffic information such as traffic jam information.

The VICS information includes traffic jam information, traffic control information, parking lot information, service area information and parking area information. Light beacon devices and radio wave beacon devices also transmit information on the positions at which the individual devices are installed, i.e. information indicating their latitudes and longitudes (secondary mesh codes, X Y normalized coordinate values) in addition to the VICS information. The vehicle position ascertained based upon such position information is more accurate than a vehicle position obtained through the GPS sensor 1c, since position information provided through a beacon can be received when the vehicle passes directly under the beacon. In this embodiment, an error range of approximately ±50 m is allowed for the position ascertained based upon the position information obtained via a beacon. In addition, it is assumed that the vehicle is running on a road that is equipped with beacon devices. However, position information provided through beacons occasionally include erroneous position information, and thus, its reliability is lower than GPS position information provided by GPS signals that are rigorously controlled and achieve a high degree of reliability.

The car navigation apparatus engages in various types of navigation operations based upon the current vehicle position information obtained by the current position detection device 1 described above and the road map data (information) in a map storage memory 2. For instance, it displays a road map around the current vehicle position and the current vehicle position on the display monitor 8 and guides the driver along the route obtained through a route search. The map storage memory 2 comprises a CD-ROM 14 constituting a recording medium for storing the road map data and a read device that reads the road map data. The recording medium does not have to be constituted of a CD-ROM, and another type of recording medium such as magnetic tape or a DVD may be used instead.

As mentioned earlier, the vehicle position obtained through the GPS sensor 1c has an error range of approximately 100 m in radius. If the current vehicle position obtained by the GPS sensor 1c is not on a road in the road map data, a correction is performed to set the vehicle position on a road in the road map data through a method referred to as map-matching in the prior art. This enables accurate display of the vehicle position on the road map at all times.

However, a map-matching operation is not always executed successfully. If it fails, the current vehicle position is detected based upon signals output by the bearing sensor 1a and the vehicle speed sensor 1b and is displayed. The state in which the vehicle position mark is moving on a place other than any of the roads in the road map in this manner is referred to as "free running". If the distance over which the vehicle is free running extends, the reliability of the vehicle position degrades.

In the embodiment, when the vehicle has been free running over a distance equal to or larger than a specific distance, a detection is performed to ascertain whether or not there is position information provided through a beacon, and if there is position information provided through a beacon and specific conditions are satisfied, map-matching is performed with the position corresponding to the position information provided through the beacon (also referred to as the beacon position). Namely, the vehicle position display is corrected by skipping the vehicle position display of the free running vehicle to the beacon position. The following is a detailed explanation of the control implemented during this process.

Figure 2:
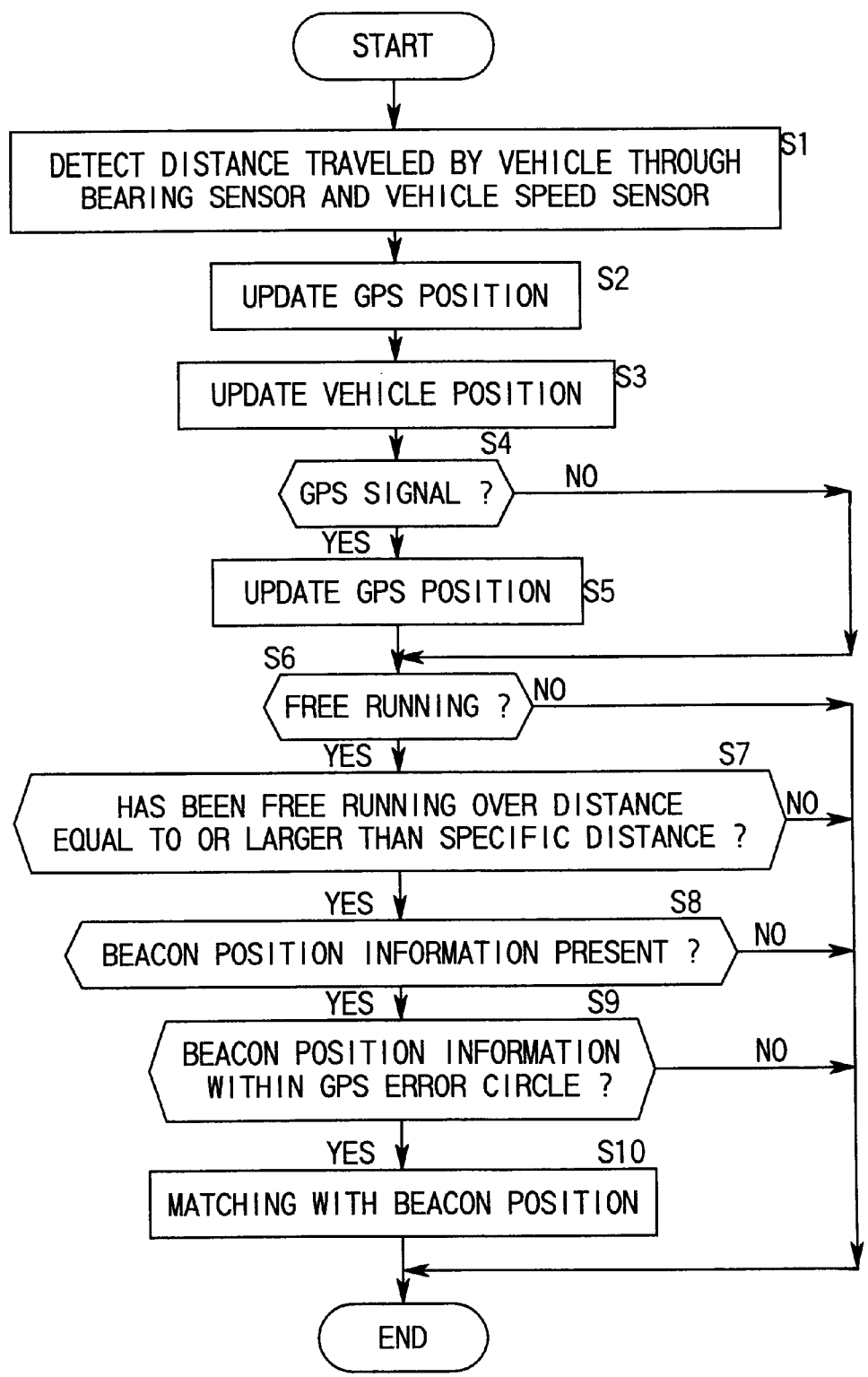
FIG. 2 shows a flowchart of the control implemented to match the vehicle position to the beacon position.

FIG. 2 is a flowchart of the control implemented to match the vehicle position to a beacon position. The routine in FIG. 2 is executed over specific time intervals. If vehicle position information is obtained through the GPS sensor 1c or vehicle position information is obtained at the light beacon reception device 10 or the radio wave beacon reception device 11 during an interval, a specific flag or the like is set and the routine is executed. Based upon the vehicle position information updated through the routine in FIG. 2, the vehicle position is displayed on the display monitor 8.

In the following explanation, the vehicle position obtained through the GPS sensor 1c is simply referred to as the "GPS position" and a vehicle position ascertained in correspondence to the GPS position and the traveled distance or a vehicle position updated through map-matching or the like is simply referred to as the "vehicle position". This vehicle position is displayed at the display monitor 8.

In step S1, the bearing sensor 1a and the vehicle speed sensor 1b are engaged to detect the relative distance over which the vehicle has traveled. Namely, the distance over which the vehicle has traveled between the time point at which the routine was last executed and the current time point at which the routine is to be executed is calculated. This traveled distance is a two-dimensional traveled distance calculated by incorporating the traveling direction. In step S2, the GPS position is updated based upon the traveled distance detected in step S1. While the GPS position is updated every time a GPS signal is received, a virtual GPS position is set to by incorporating the distance traveled by the vehicle if the vehicle is moving during an interval.

In step S3, the vehicle position is updated based upon the traveled distance ascertained in step S1. Namely, a new vehicle position is obtained by adding the traveled distance ascertained in step S1 to the vehicle position resulting from the most recent update.

In step S4, a decision is made as to whether or not a GPS position has been obtained through the GPS sensor 1c during the period of time elapsing between the most recent execution of the routine and the current execution of the routine. If a GPS position has been obtained, the specific flag will have been set, and accordingly, the flag is checked to ascertain if it is set. If it is decided in step S4 in that GPS position information has been obtained, the operation proceeds to step S5 to update the GPS position in correspondence to the contents of the new GPS information. As a result, the GPS position is updated in conformance to the latest contents at all times by obtaining GPS signals, and if a vehicle moves during an interval between GPS signal receptions, the position is updated to a virtual GPS position in correspondence to the traveled distance. If it is decided in step S4 that no GPS position has been obtained, the operation skips step S5 and proceeds to step S6.

In step S6, a decision is made as to whether or not the vehicle is currently free running. As explained earlier, "free running" means that the vehicle position is displayed in a non map-matched state. More specifically, the vehicle position is not displayed on a road in the road map displayed based upon the road map data stored in the map storage memory 2. The map-matching process is performed in a routine which is not shown and, since a specific flag is set if map-matching is not achieved, this flag is checked in step S6. If it is decided in step S6 that the vehicle is currently engaged in free running, the operation proceeds to step S7. In step S7, a decision is made as to whether or not the vehicle has been free running over a distance equal to or larger than a specific distance. If the vehicle has been free running over a distance equal to or larger than the specific distance, the operation proceeds to step S8 to make a decision as to whether or not beacon position information has been obtained.

The beacon position information in this context refers to position information included in beacon information received by the light beacon reception device 10 or radio wave beacon reception device 11. In step S8, a decision is made as to whether or not beacon position information has been obtained during a period elapsing between the last execution of the routine and the current execution of the routine. If beacon position information has been obtained, the specific flag will have been set and, accordingly, the flag is checked to ascertain if it is set. If there is new beacon position information, the operation proceeds to step S9.

In step S9, a decision is made as to whether or not the position corresponding to the beacon position information (also referred to as the beacon position) is within the error range for the GPS position. If the GPS position has been updated in correspondence to the distance traveled by the vehicle, this decision is made based upon the updated virtual GPS position. The error range for the GPS position in the embodiment is a circle with a radius of 100 m. Accordingly, a decision is made as to whether or not the position corresponding to the beacon position information coordinates is within a 100 m radius circle around the position corresponding to the coordinates of the GPS position or the virtual GPS position if the GPS position has been updated. This 100 m radius circle is referred to as the GPS position error circle. If it is decided in step S9 that the position corresponding to the beacon position coordinates is inside the GPS position error circle, the operation proceeds to step S10. In step S10, the vehicle position is matched with the beacon position, and the processing ends. In other words, the vehicle position is updated to the position corresponding to the beacon position information.

If it is decided in step S6 that the vehicle is not engaged in free running, if it is decided in step S7 that the vehicle has not been free running over a distance equal to or larger than the specific distance, if it is decided in step S8 that there is no beacon position information or if it is decided in step S9 that the position corresponding to the beacon position information is not within the GPS position error circle, the processing ends without matching the vehicle position to the beacon position.

As described above, a decision is made as to whether or not beacon position information providing position information that is not highly reliable but highly accurate is within the error range of the GPS position information providing position information that is highly reliable but not highly accurate. Then, if it is decided that the beacon position information is within the error range of the GPS position information, the beacon position information with a higher degree of accuracy is utilized as effective position information. Thus, acquisition of position information that assures a high degree of reliability and a high degree of accuracy is enabled. It is to be noted that the high/low degrees of reliability and the high/low degrees of accuracy as referred to above are relative degrees of the two types of information.

In step S9, with a virtual GPS position set in correspondence to the distance traveled by the vehicle and a decision is made as to whether or not the beacon position is within the error circle around the virtual GPS position. However, the present invention is not restricted by these details. The error circle may be expanded in correspondence to the distance traveled by the vehicle. Namely, if the vehicle moves after setting the center of the error circle at the GPS position, the errors circle may be expanded in correspondence to the traveled distance to make a decision as to whether or not the beacon position is within the expanded range with the GPS position at its center. In addition, the degree to which the error circle is expanded may be calculated based upon the length of time that has elapsed after the GPS position was obtained. Namely, the error circle may be expanded in correspondence to a value achieved by multiplying the length of time that has elapsed after the GPS position was obtained by a specific coefficient to make a decision as to whether or not the beacon position is within the expanded range.

Variation

While the correction implemented on the vehicle position display of the position of a free running vehicle is explained in reference to the embodiment above, the present invention is not restricted by these details and it may be adopted in the vehicle while it is not engaged in free running. For instance, it may be adopted in a matching operation performed when an express highway and a regular road extend parallel to each other and the vehicle appears on the display as if it were running on the regular road although it is actually running on the expressway.

Figure 3:
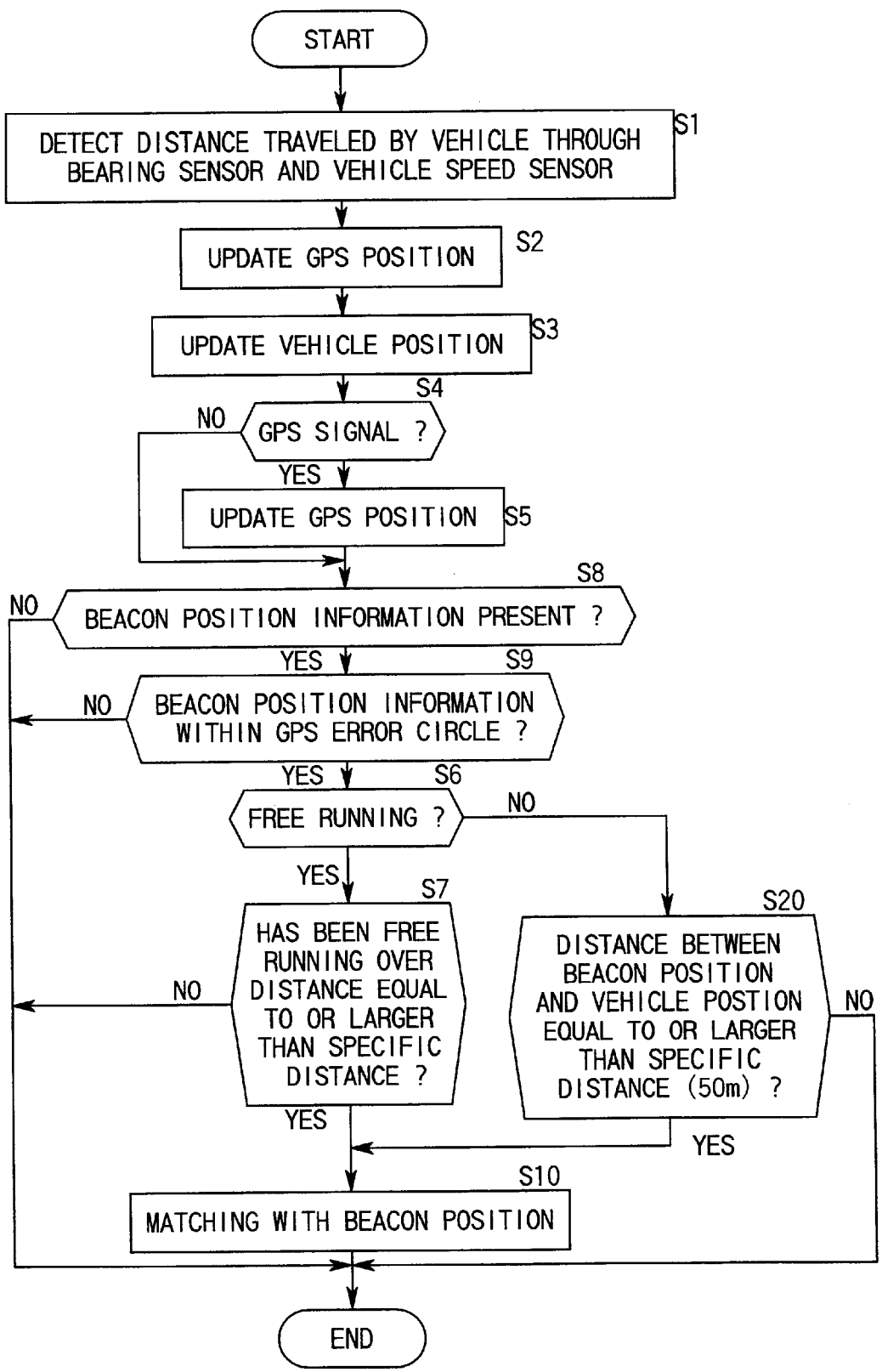
FIG. 3 shows a flowchart of the control implemented in a variation to match the vehicle position with the beacon position.

FIG. 3 is a flowchart of the control implemented in such a case. The same step numbers are assigned to steps achieving functions identical to those in the steps in the flowchart in FIG. 2. In more specific terms, the control in FIG. 3 is achieved by changing the order in which steps S6~S9 in FIG. 2 are implemented and adding step S20.

The processing implemented in steps S1~S5 is identical to the corresponding processing in FIG. 2. In step S8, a decision is made as to whether or not beacon position information has been obtained during the period elapsing between the last execution of the routine and the current execution of the routine. If beacon position information has been obtained, the specific flag will have been set and, accordingly, the flag is checked to ascertain if it is set. If there is new beacon position information, the operation proceeds to step S9. In step S9, a decision is made as to whether or not the position corresponding to the beacon position information (hereafter referred to as the beacon position) is within the error range for the GPS position. If the GPS position has been updated in correspondence to the distance traveled by the vehicle, this decision is made based upon the updated virtual GPS position, as in the control shown in FIG. 2. The error range for the GPS position in this variation is a circle with a radius of 100 m. Accordingly, a decision is made as to whether or not the position corresponding to the beacon position information coordinates is within a 100 m radius circle around the position corresponding to the coordinates of the GPS position or the virtual GPS position if the GPS position has been updated. This 100 m radius circle is referred to as the GPS position error circle. If it is decided in step S9 that the coordinates corresponding to the beacon position are inside the GPS position error circle, the operation proceeds to step S6.

In step S6, a decision is made as to whether or not the vehicle is currently free running. If it is decided in step S6 that the vehicle is currently engaged in free running, the operation proceeds to step S7. In step S7, a decision is made as to whether or not the vehicle has been free running over a distance equal to or larger than a specific distance. If the vehicle has been free running over a distance equal to or larger than the specific distance, the operation proceeds to step S10.

If, on the other hand, it is decided in step S6 that the vehicle is not engaged in free running, the operation proceeds to step S20. In step S20, a decision is made as to whether or not the distance between the obtained beacon position and the vehicle position is equal to or larger than a specific distance (e.g., 50 m) This specific distance represents the error range of the beacon reception device. The light beacon reception device 10 and the radio wave beacon reception device 11 each have a specific range over which it is capable of receiving a beacon. In addition, the vehicle is running at a specific speed and, therefore, a position obtained based upon the beacon position information has a specific error range. If the vehicle position is outside this error range, it means that the vehicle position has been updated to inaccurately due to erroneous map-matching or the like. It is to be noted that it has already been decided in step S9 that the data indicating the beacon position are reliable.

If it is decided in step S20 that the distance between the beacon position and the vehicle position is equal to or larger than the specific distance, the operation proceeds to step S10. In step S10, the vehicle position is matched with the beacon position and the processing ends. In other words, the vehicle position is updated to the position corresponding to the beacon position information. If it is decided in step S20 that the distance between the beacon position and the vehicle position is not equal to or larger than the specific distance, it is decided that the current vehicle position is accurate and the processing ends without matching it to the beacon position.

If it is decided in step S8 that there is no new beacon position information, if it is decided in step S9 that the position corresponding to the beacon position information is not within the GPS position error circle or if it is decided in step S7 that the vehicle has not been free running over a distance equal to or larger than the specific distance, too, the processing ends without matching the vehicle position with the beacon position.

Through the processing described above, even when the vehicle is not free running, if it is decided that the vehicle position is erroneous based upon the beacon position having been determined to be reliable, matching is achieved using the beacon position to implement accurate vehicle position display. This processing may be implemented to great advantage when, for example, an express highway and a regular road extend parallel to each other and the vehicle position is set on the wrong one through erroneous map-matching.

While an explanation is given in reference to the embodiment and the variation above on an example in which the beacon position is used to correct the vehicle position display, the present invention is not limited to this example. The beacon position determined to be reliable as described above can be utilized in various manners.

While the explanation is given above in reference to the embodiment and the variation on an example in which the present invention is adopted in a car navigation apparatus, it is not limited to this example, and it may be adopted in various other types of navigation apparatuses in addition to car navigation apparatuses.

While the explanation is given above in reference to the embodiment and the variation on an example in which the vehicle position which is both reliable and highly accurate is ascertained based upon the beacon position and the GPS position, the present invention is not limited to this example, and it may be adopted in all situations in which a device capable of obtaining information that is highly reliable but not highly accurate and a device capable of obtaining information that is not highly reliable but highly accurate are combined to obtain information that is both reliable and highly accurate.

While the explanation is given above in reference to the embodiment on an example of the vehicle traffic information communication system (VICS) that is operated in Japan and provides road traffic information, the present invention is not limited to this example. Any type of system that provides road traffic information by utilizing radio wave beacon and/or light beacon may be available. Also, another type of vehicle traffic information communication system that similar to the VICS and is operated in any countries may be available. Namely, the present invention can be applied to any cases in which information is transmitted by utilizing radio wave beacon, light beacon or the like, and position information is included therein.

Also, an information transmitting device may be a device other than the radio wave beacon device or the light beacon device that is used in Japan. Namely, any type of device that transmits position information may be adopted.

Also, the information transmitting device may be a beacon device installed on a buoy on the seat or at a lighthouse. In this case, the present invention can be applied when detecting the position of ship.

While the explanation is given above in reference to the embodiment on an example of GPS signals from GPS satellites, the present invention is not limited to this example. The present invention can be applied on a commercial satellite system. Namely, any type of system in which position information can be obtained by utilizing a satellite can be adopted.

In addition, while the control program executed by the control circuit 3 in the car navigation apparatus is stored in the ROM 12 in the above embodiment explained above, the present invention is not limited to these particulars. The control program and the installation program may be provided in a recording medium such as a CD-ROM 14.

Figure 4:
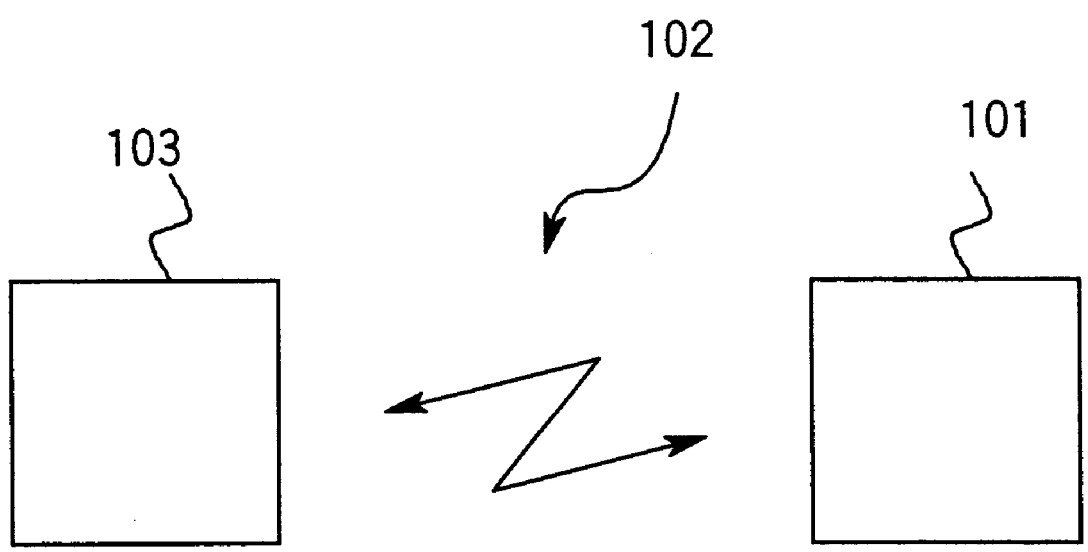
FIG. 4 illustrates that a program is provided via a transmission medium.

Furthermore, these programs may be provided via a transmission medium such as a telecommunication line, a typical example of which is the internet. In other words, the programs may be converted to signals transmitted through a transmission medium. FIG. 4 illustrates how this may be achieved. A car navigation apparatus 101, which is the car navigation apparatus explained earlier, has a function of connecting with a telecommunication line 102. A computer 103 is a server computer in which the control program to be provided to control the car navigation apparatus 101 is stored. The telecommunication line 102 may be a telecommunication line for connection with the Internet, for personal computer communication or the like or it may be a dedicated telecommunication line. A telecommunication line 102 is a telephone line or a wireless telephone line such as a line for a portable telephone.

It is to be noted that the car navigation apparatus may be realized by having the control program described above executed on a personal computer. In such a case, the current position detection device 1, the FM multiplex broadcast reception device 9 and the like may be connected to specific I/O ports or the like of the personal computer.

What is claimed is:

1. A navigation apparatus comprising:
   a first position information generating device that generates first position information as current position information regarding the navigation apparatus based upon a signal received from outside of the navigation apparatus;

a second position information generating device that generates second position information as current position information based upon another signal received from outside of the navigation apparatus that is different from said signal; and a control device that implements control to provide route guidance based upon current position information and map information, wherein:

said control device uses said first position information as effective current position information if a position corresponding to said first position information generated by said first position information generating device is within an error range set for a position corresponding to said second position information generated by said second position information generating device.

2. A navigation apparatus according to claim 1, wherein:
said first position information has a higher degree of accuracy and a lower degree of reliability than said second position information.

3. A navigation apparatus according to claim 1, wherein:
said navigation apparatus is a navigation apparatus installed in a vehicle; and
said first position information generating device includes a beacon reception device that receives information transmitted by a beacon device installed at a road and generates said first position information by receiving position information indicating a position at which said beacon device is installed.

4. A navigation apparatus according to claim 1, wherein:
said second position information generating device includes a satellite signal reception device that receives position signals from satellites and generates said second position information based upon said position signals which have been received.

5. A navigation apparatus according to claim 3, wherein:
said second position information generating device includes a satellite signal reception device that receives position signals from satellites and generates said second position information based upon said position signals which have been received.

6. A navigation apparatus according to claim 1, further comprising:
a movement detection device that detects movement of the navigation apparatus, wherein:
said movement detection device detects said movement of the navigation apparatus occurring over a period of time in elapsing between a time point at which said second position information generating device generates said second position information and a time point at which said first position information generating device generates said first position information; and
said control device assumes a new position by incorporating said movement detected by said movement detection device into said position corresponding to said second position information and utilizes said first position information as effective current position information if the position corresponding to said first position information is within said error range relative to said new position.

7. A navigation apparatus according to claim 1, further comprising:
a movement detection device that detects movement of the navigation apparatus, wherein:
said movement detection device detects said movement of the navigation apparatus occurring over a period of time in elapsing between a time point at which said second position information generating device generates said second position information and a time point at which said first position information generating device generates said first position information; and
said control device expands said error range set for the position corresponding to said second position information by taking into consideration a traveled distance based upon said movement detected by said movement detection device.

8. A navigation apparatus according to claim 1, wherein:
said control device expands said error range set for the position corresponding to said second position information by taking into consideration a length of time elapsing between a time point at which said second position information is generated by said second position information generating device and a time point at which said first position information is generated by said first position information generating device.

9. A navigation apparatus according to claim 1, wherein:
said first position information generating device includes a position signal reception device that receives information transmitted by a position signal providing device and generates said first position information by receiving position information indicating a position at which said position signal providing device is installed.

10. An information generating apparatus, comprising:
a first information generating device that generates first information as specific information;
a second information generating device that generates second information as said specific information;
a control device that uses said first information or said second information as said specific information under different circumstances, wherein:
said second information has a predetermined error range with respect to said specific information;
said first information has a higher degree of accuracy and a lower degree of reliability than said second information; and
said control device uses said first information as said specific information when said first information is within said error range of said second information.

11. A recording medium that records a control program for a navigation apparatus, the control program comprising:
a first instruction that generates first position information as current position information regarding the navigation apparatus based upon a signal received from outside of the navigation apparatus;
a second instruction that generates second position information as current position information based upon another signal received from outside of the navigation apparatus that is different from said signal;
a third instruction that determines said first position information as effective current position information if a position corresponding to said first position information generated by said first position information generating device is within an error range set for a position corresponding to said second position information generated by said second position information generating device; and
a fourth instruction that implements control to provide route guidance based upon said effective current position information and map information.

12. A data signal transmitted through a communication line comprising a control program for a navigation apparatus, the control program comprising:

a first instruction that generates first position information as current position information regarding the navigation apparatus based upon a signal received from outside of the navigation apparatus;

a second instruction that generates second position information as current position information based upon another signal received from outside of the navigation apparatus that is different from said signal;

a third instruction that determines said first position information as effective current position information if a position corresponding to said first position information generated by said first position information generating device is within an error range set for a position corresponding to said second position information generated by said second position information generating device; and a fourth instruction that implements control to provide route guidance based upon said effective current position information and map information.

* * * * *